US012789466B2

(12) United States Patent
Cavallaro et al.

(10) Patent No.: US 12,789,466 B2
(45) Date of Patent: Nov. 10, 2026

(54) 3D PRINTING MACHINE AND MANUFACTURING METHOD

(71) Applicant: THINKING ADDITIVE LIMITED, London (GB)

(72) Inventors: Marco Cavallaro, London (GB); Marko Chorbikj, London (GB)

(73) Assignee: THINKING ADDITIVE LIMITED, London (GB)

( * ) Notice: Subject to any disclaimer, the term of this patent is extended or adjusted under 35 U.S.C. 154(b) by 1112 days.

(21) Appl. No.: 17/797,139

(22) PCT Filed: Nov. 18, 2020

(86) PCT No.: PCT/IB2020/060860
§ 371 (c)(1),
(2) Date: Aug. 3, 2022

(87) PCT Pub. No.: WO2021/099957
PCT Pub. Date: May 27, 2021

(65) Prior Publication Data

US 2023/0053819 A1 Feb. 23, 2023

(30) Foreign Application Priority Data

Nov. 18, 2019 (WO) .................. PCT/IB2019/059892
Nov. 19, 2019 (IT) ........................ 102019000021615

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/182* (2017.08);
(Continued)

(58) Field of Classification Search
CPC ... B29C 64/112; B29C 64/118; B29C 64/182; B29C 64/209; B29C 64/232;
(Continued)

(56) References Cited

U.S. PATENT DOCUMENTS 9,011,136 B1 4/2015 Uzan et al.
2010/0021580 A1* 1/2010 Swanson ................ B33Y 30/00 425/132
(Continued)

FOREIGN PATENT DOCUMENTS

CN 108527846 A 9/2018

OTHER PUBLICATIONS

Ulticreatr 2X—Dual Extruder Upgrade for Ultimaker 3D Printers, 2016, retrieved from: https://www.youtube.com/watch?v=Oxay5LholH4.
(Continued)

*Primary Examiner* — Xiao S Zhao
*Assistant Examiner* — Joseph S Leyson
(74) *Attorney, Agent, or Firm* — Bayramoglu Law Offices LLC

(57) ABSTRACT

A multi-head 3D printing machine has first and second common guides for a plurality of deposition heads and provides a relative displacement between the deposition heads along a third guide, the first, second and third guides identifying a reference frame. The 3D printing machine further includes a control unit programmed to process a sequence of discretized position information within the reference frame and deposition information so as to deposit non-replica, non-mirrored segments while the deposition heads simultaneously operate.

20 Claims, 11 Drawing Sheets

(51) Int. Cl.

| | |
|---|---|
| ***B29C 64/182*** | (2017.01) |
| ***B29C 64/209*** | (2017.01) |
| ***B29C 64/232*** | (2017.01) |
| ***B29C 64/236*** | (2017.01) |
| ***B33Y 10/00*** | (2015.01) |
| ***B33Y 30/00*** | (2015.01) |
| ***B33Y 50/02*** | (2015.01) |

(52) U.S. Cl.
CPC .......... *B29C 64/209* (2017.08); *B29C 64/232* (2017.08); *B29C 64/236* (2017.08); *B33Y 10/00* (2014.12); *B33Y 30/00* (2014.12); *B33Y 50/02* (2014.12)

(58) Field of Classification Search
CPC ... B29C 64/236; B29C 64/386; B29C 64/393; B33Y 10/00; B33Y 30/00; B33Y 50/00; B33Y 50/02
See application file for complete search history.

(56) References Cited

U.S. PATENT DOCUMENTS

2014/0363532 A1* 12/2014 Wolfgram ............. B29C 64/236 425/113
2015/0035198 A1 2/2015 Saba
2019/0118467 A1* 4/2019 Neboian ................ B33Y 10/00

OTHER PUBLICATIONS

Sigma & Sigmax R19: A new generation of BCN3D Technologies 3D printers, 2018, retrieved from: https://www.youtube.com/watch?v=q7UxQWz5Nm8.
Theta Printer—First Print, 2013, retrieved from: https://www.youtube.com/watch?v=m8RTONaKNfc.
FlashForge Creator 3 Independent Dual Extruder 3D Printer, 2019, retrieved from: https://www.youtube.com/watch?v=mU3iEQRtTUo.
The Cronus: Multi-Head 3D Printing, 2017, retrieved from: https://www.youtube.com/watch?v=TkEOMQ6rQ6s.
Theta Printer—Hackaday Prize Submission, 2014, retrieved from: https://www.youtube.com/watch?v=8SplsSDy6So.

* cited by examiner

3D PRINTING MACHINE AND MANUFACTURING METHOD

CROSS REFERENCE TO THE RELATED APPLICATIONS

This application is the national phase entry of International Application No. PCT/IB2020/060860, filed on Nov. 18, 2020, which is based upon and claims priority to International Application No. PCT/IB2019/059892, filed on Nov. 18, 2019, and Italian Patent Application No. 102019000021615, filed on Nov. 19, 2019, the entire contents of which are incorporated herein by reference.

TECHNICAL FIELD

The present invention refers to a 3D printer and a manufacturing method including such machine in particular for simultaneously printing of at least a pair of objects or sub-parts that are in a way related to each other by the relative symmetry or duality of human body, e.g. both orthopaedic and comfort left and right insoles of a pair of shoes, or left and right shin guards for sport equipment or left and right arm guard as a protective equipment in certain professions. These products are examples of applications where the paired design of paired objects represents the duality of human body, specifically related to the left and right extremities. In another example, the pair of objects might be designed around non-dual body segments, with the relative symmetry represented across both front facing and side facing plane passing vertically through the body e.g. a front and rear part of an orthopaedic chest support, left and right halves of a helmet to be subsequently joined and the like. In the latter instance, helves are sub-parts that are joined after the printing process to obtain the final object.

BACKGROUND

So far, 3D printing has been widely used in many fields in view of its high flexibility, in particular for rapid prototyping.

The recent trend of customization of products calls for flexible manufacturing methods but, at the same time, mass production of customized goods requires efficient and rapid manufacturing lines. This is in particular important for wearable consumer goods in view of the spreading of 3D scanning and biometric sensors to collect biometric data and asymmetry within the body and/or differences from the body of one person to the body of another person.

Although there exists personalized solutions usually handmade or made by CAD/CAM systems for market niches, in most cases, in the current market, the offer of paired products such as mass-produced 'mirrored' insoles, provides for two objects that are perfectly symmetrical with respect to a plane (i.e. mirrored products). In view of an increasing demand for personalized or tailor-made solutions based e.g. on biometric data, nowadays much more easily gathered via 3D scanners, pressure and motion sensors, optical systems or other similar devices, a need is felt on the market to not only better select a pair of shoes among the existing ones but also to provide non-symmetrical paired product taking into account differences among the consumers and also the ones caused by asymmetry of the individual, e.g. from left and right side of the consumer's body.

At the moment, it is possible to manufacture different products, including non-symmetrical paired products, by dedicating to each of the products a specific flexible manufacturing line. This requires a relatively high expenditure because the total number of machines is doubled with respect to a single manufacturing line. Otherwise, a single flexible manufacturing line takes about twice the time for producing a pair of non-symmetrical products because only a single product is manufactured at a time. The inefficiency of the current approach also relies on the need to feed two different systems with different machine instructions and settings (this especially for Extrusion Deposition Technique systems).

In the field of additive manufacturing, and with specific reference to Extrusion Deposition Techniques, any part or sub-part which is added to a printing job and so included in the working volume, generates nearly a proportional time increase due to the need to extrude an added amount of material directly linked to the geometry and orientation of the new part or sub-part so added. In other words, and differently from other 3D printing techniques, there is almost zero scale factor in adding more components in a same printing job, i.e. in the need to print two objects instead of one, the corresponding production time is nearly doubled. Even in the case of depositing sacrificial supporting features with the aim to hold final parts from gravity collapsing, the corresponding production time results sensitively increased. For this, the need to print more efficiently supporting features has evolved into a system with a second head, with its own respective opening (Ultimaker https://www.youtube.com/watch?v=Oxay5LhoIH4). The latter shall be used exclusively for depositing support materials, with a corresponding and consequent added time for these specific auxiliary parts. By doing so, the presence of a second and dedicated head brings the possibility to use a dedicated material which simplifies the separation of the sacrificial parts, more easily removable via chemical or mechanical procedures, decreasing so the overall time for production. In this variant, the printing heads are mechanically connected to each other, having a fixed relative positioning (offset). Further evolutions of double heads have been recently disclosed (BCN3D https://www.youtube.com/watch?v=q7UxQWz5Nm8), also in a non-cartesian setup (an example reference: Theta https://www.youtube.com/watch?v=m8RTONaKNfc) where the two deposition heads are independent, and free to move independently, changing the relative positioning between each other along one or more directions; they can print support and model materials by using the two deposition heads in a sequential way: while one head proceeds with the manufacturing process, by depositing its corresponding material, the other is held in a standby status. An example is when one head deposits a supporting sacrificial structure that will be removed in the finished product, while, the other head deposits layers of the final product which is physically supported, especially for the overhanging features, by the supporting structure. According to such example, the deposition heads sequentially work to produce a finished article or object. Differently from the previous variant, where the two extruders are attached, the use of independent extruders can bring much more functionalities to the 3D printing systems, this specifically in relation to productivity. It is in fact possible to use the independent extruders not only sequentially but also simultaneously to print two or more replicates of the same object (increased productivity by multiple copies of the same identical geometry) or otherwise to print two or more sections of the same object meant as a whole product (increased productivity by decreasing the time needed for the manufacturing of one object).

In the first case, where the increased productivity is achieved by multiple copies of the same identical geometry and a first and second deposition heads are implemented, the latter are controlled for the simultaneous production of multiple instances of the same object, whether it has been deposited in the same orientation by the two heads, also meant as replica mode, or in a mirrored mode with reference to a plane perpendicular to the axis along which the multiple deposition heads are movable. In both modes the extruders are not independently programmed. An example of these methods are: two extruders receive the same coordinates and deposition material quantity for which one of the three coordinates, more specifically the common axis (X) is differentiated by the distance or offset of the two extruders along the common axis and direction (replica mode) or with the inverted values of the common axis and direction (mirrored mode): from [X, Y] to [X+Extruders Distance, Y] in replica mode or either to [−X, Y] coordinates in the mirrored mode) (an example reference: FlashForge https://www.youtube.com/watch?v=mU3iEQRtTUo).

In the second case, where the increase in productivity is achieved by speeding up the manufacturing process of one single part, a first and second deposition head simultaneously deposit a first and a second segment of the same object, for any given layer (an example reference: Cartesian reference frame Titan https://www.youtube.com/watch?v=TKEOMQ6rQ6s; polar reference frame Theta https://www.youtube.com/watch?v=8SplsSDy6So). In such a case, the extruders are independently programmed and they follow individual instructions after a preparatory modeling/process planning operation able to split the same object in several inter-connected parts to be produced at the same time. This implies that each layer must have a number of meeting locations where a segment from different heads come close to one another. Each meeting location is a structural weakness point for the layer and, therefore, for the printed object as a whole. This problem is solved by overlapping, in a subsequent layer, a segment from the first head on one from the second head deposited on the previous layer or vice versa. However, meeting locations cannot be avoided within each layer and this reflects on the overall structural performance of the object printed by the two heads.

While the solutions currently present in the art offer certain advantages in the field of deposition techniques of Additive Manufacturing and improved productivity, none of the current solutions enable the simultaneous production of multiple different objects with optimal structure, manufactured by multiple deposition heads.

SUMMARY

The scope of the present invention is to provide a 3D printing machine and manufacturing method including such machine able to provide customized and structurally performing goods at an efficient manufacturing rate, in particular paired or set of objects with comparable encumbrance e.g. because of left-right or front-back asymmetry of the human body. Uses taking advantage of the present invention span from orthosis to sport goods for professional and amateur athletes, to mass production goods such as shoes for daily use, including midsoles, heels and other shoes components. More generally, objects manufactured according to the present invention are either two or more finished objects, such as e.g. a pair of midsoles, two or more semi-finished objects, such as e.g. a pair of arm guards to be finished after printing e.g. by a sander to provide a smooth texture, two or more sub-parts to be joined after printing to have the final object, e.g. left and right half of a helmet.

The scope of the present invention is achieved by a multi-head additive manufacturing machine comprising:

A common first guide aligned to a first direction;

A common second guide aligned to a second direction;

A multi-deposition unit comprising at least a first and second deposition device wherein first and second deposition devices are independently actuatable to provide different quantities of deposition material;

A multi-head unit movable with respect to the first and the second common guide and comprising at least a first and a second motorized deposition heads movable with respect to one another along a third guide aligned to a third direction, the first, second and third directions defining a three-dimensional reference frame for deposition; wherein the first and second printing heads comprise a respective opening through which the material is deposited;

An electronic control unit programmed to:

control the movement of the first and second deposition heads via actuators within the reference frame by processing at least a discretized sequence of coordinate value sets within the reference frame representing pre-defined first and second deposition paths for the respective first and second deposition heads as a plurality of points;

provide, via a pre-defined first deposition quantity information for the first deposition head and a second deposition quantity information for the second deposition head, each of said deposition quantity information being associated to said points, a pre-defined quantity of material to be deposited along the first and second deposition paths via the openings and the deposition system;

wherein the first and the second deposition heads are controlled with identical movements along the first and the second direction, wherein said coordinate values further include a first position information along the third direction for the first deposition head and a second position information along the third direction for the second deposition head such that, for at least a section of said sequence where the first and second deposition heads shall simultaneously deposit, the first and second deposition paths describe arbitrarily different, non-mirrored, non-replica first and second segments, such segments having, for a first span along the first direction and for a second span along the second direction, a corresponding first length associated to the first head and a corresponding second length associated to the second head so that the first segment has a different length from that of the second segment, the control unit coordinating the first and second deposition heads by operating said actuators and deposition system so that, when the first and second deposition heads simultaneously operate based on said section, each coordinate value set of said sequence having identical coordinate values along the first and second directions and different values along the third direction and for the first and second deposition information, is simultaneously reached by the first and second deposition heads so that the first and the second segment are synchronously deposited over the same time interval by having a first travelling speed of the first head higher than a second travelling speed of the second head when the first segment is longer than said second segment.

According to the above, a sequence of instructions comprising, for each point of the sequence, information about six degrees of freedom each corresponding to an actuator of the machine and relative to position information and deposition information, provide a compromise between flexibility for the designer to print different objects and improve productivity by having the heads printing at the same time. Furthermore, the selection of position and deposition information according to a discretized sequence guarantees coordination of motion and this positively impacts synchronism and productivity.

Furthermore, a first and a second direction of motion are constrained and heads are independent along the third direction of a three axes reference frame in order to reduce inertial forces and at the same time providing a certain degree of freedom in depositing the proper profile, contours or shapes as needed for the desired parts, which are therefore not identical or mirrored to one another at the end of the printing process. In particular, two non-replica segments have different respective lengths and are deposited over the same corresponding time interval. Therefore, the speed along the third direction is higher for the head that deposits the longer segment. This also strongly helps to program the control unit for actuating the heads because two out of three coordinates are in common. Another degree of freedom for the deposition process is the quantity of material of each head and potentially for each point of the deposition path array. Quantity may be expressed in different forms, e.g. volume of material between two adjacent points of the deposition path array, deposition rate or the length of filament with known cross section to be deposited through the deposition openings. For example, the quantity assigned to each deposition head is different when the third coordinate of paired points within the array is different in order to preserve a constant thickness and width of the deposited filament. In particular, when the difference between the third coordinates of the heads tends to increase, quantity of the head having the higher third coordinate shall be greater than that of the other head because the former is covering a longer section of its path than the corresponding one of the latter head. It is also possible that thickness and/or width of the deposited filament is different on various paths and this may help the designer to obtain the required relatively small difference between the products printed by the two heads.

Deposition techniques include but is not limited to extrusion of a polymeric material through a nozzle. Furthermore, the polymeric material may include non-polymeric particles, e.g. a composite material having a polymeric matrix and particles, fibers or the like embedded in the matrix. In addition, the material, polymeric or non-polymeric, may be softened or sintered or melted during deposition or is in a liquid-like or gel-like form during deposition, to be cured or generally solidified after deposition.

According to a preferred embodiment, the sequence is such that a discretization step pattern, i.e. the plurality of steps between adjacent points of the sequence, is common for the first and second deposition paths and, at the same time, the steps have variable values along the pattern so that, ideally, an operational parameter of the machine, e.g. the deposition of complex shapes having e.g. variable local radius of curvature, is optimized. In order to provide a synchronous motion of the deposition heads, the discretization step pattern is generated based on the deposition path with the most complex shape and is assigned as a common step pattern to all other deposition paths.

According to a preferred embodiment, each head prints a relative finished or semi-finished object or sub-part, i.e. deposition path of the first head do not overlap on the deposition path of the second deposition head and vice-verse at least along a section, e.g. at least two layers, of the sequence. In doing so, for each layer the filament may be continuous in order to provide the highest possible strength and structure. Meeting locations are avoidable for the benefit of mechanical performances. The machine simultaneously manufactures at least two objects or sub-parts that are neither identical (offset) nor mirrored. In particular, in the latter instance, according to the above the coordinates along the third direction are different both in sign and magnitude.

According to a preferred embodiment of the present invention, the control unit is programmed to calculate for each printing head:

- the speed of the printing head from a starting point to the adjacent one along the respective deposition path based on the sequence so that the first and second printing heads simultaneously start from the respective starting point and simultaneously are in the respective adjacent points, travelling at different speeds between the starting points and the adjacent points when the distance between the starting points and the adjacent points along the respective deposition paths is different; and
- each deposition rate based on said quantity and speed between a point and a subsequent one of the relative path or on the distance between a point and a subsequent one of the relative path;
- wherein points of the first and second deposition paths are paired via the sequence so that for each pair the coordinate along the first direction and the coordinate along the second direction are equal and the control unit is programmed so that the heads are synchronized to reach each pair of points at a same given time.

Synchronism of deposition is crucial to valorize at maximum the scope of the invention as the total production rate for making 3D printed paired objects or sub-parts would be improved.

Furthermore, deposition rate is fine-tunable for each interval between two adjacent points for each deposition path and this may either provide a constant thickness and width bead over each deposition path or a variable thickness and/or width bead between two adjacent intervals on the same path.

The sequence as defined above provides the designer with a programming framework that is machine independent: starting from the same sequence, it will depend on the printing machine, including the deposition unit, to calculate a time and deposition rate that are within the specifications of the printing machine's hardware.

According to an embodiment of the invention, it is also provided a manufacturing method of two or more personalized paired products, e.g. soles of shoes, insoles, shinguards, football chest protection, knee supports, arm guards, elbow braces, leg pads, shoulder pads etc. or of a product comprising joined halves e.g. a helmet to be worn by an individual, comprising the step of providing the additive manufacturing machine according to any of the above paragraphs, and the step of printing the paired products or the halves of the halved product, wherein the first deposition path refers to one of the paired product, e.g. a left sole or front protection, and the second deposition path refers to the other paired product, e.g. a right sole or back protection, the control unit coordinating the first and second deposition heads by operating said actuators and deposition system so that, when the first and second deposition heads simultaneously operate based on said section, each coordinate value set of said sequence having identical coordinate values along the first and second directions and different values along the third direction and for the first and second deposition information, is simultaneously reached by the first and second deposition heads. It is important to note that 'personalized' comprises both personalization based on measurements on the final user, e.g. via a 3D scanner, and that based on a selection from a library of pre-defined geometries, such that one product of the pair is not a perfect symmetric sample of the other product of the pair.

Manufacturing paired or multiple products/sub-parts with relatively small differences, i.e. non identical or non-symmetric products, particularly exploits the manufacturing capacity of the machine according to the invention.

According to a preferred embodiment of the present invention, the method further comprises the step of collecting a biometric measure, e.g. a 3D scanning, of a part or parts of the body where the paired or halved products is adapted to be worn and wherein the first and second paths are linked to such biometric measure.

According to a preferred embodiment of the present invention, the manufacturing method further comprises the step of orienting a first and a second shape within the reference frame defined by the first, second and third direction, each shape being the respective base for the first and second deposition path, so that there is a minimum number of points within the position array that do not share the first and the second coordinates, the step of orienting being antecedent to the step of printing. In one example, a preferred orientation of the objects can be found by running an algorithm that iteratively changes the orientation of the objects and analyses the contour projections of the objects on the YZ plane. Therefore, by using an algorithm that e.g. minimises the difference between the obtained planar projections in YZ plane of both objects instead of minimising the bounding box volume as described, a preferred orientation can be found which maximises the simultaneous use of both of the deposition heads and improves the efficiency of the present invention.

The step of orienting aims at optimizing the exploitation of the printing machine, which is maximum when both heads deposit at the same time.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION OF THE EMBODIMENTS

Figure 1:
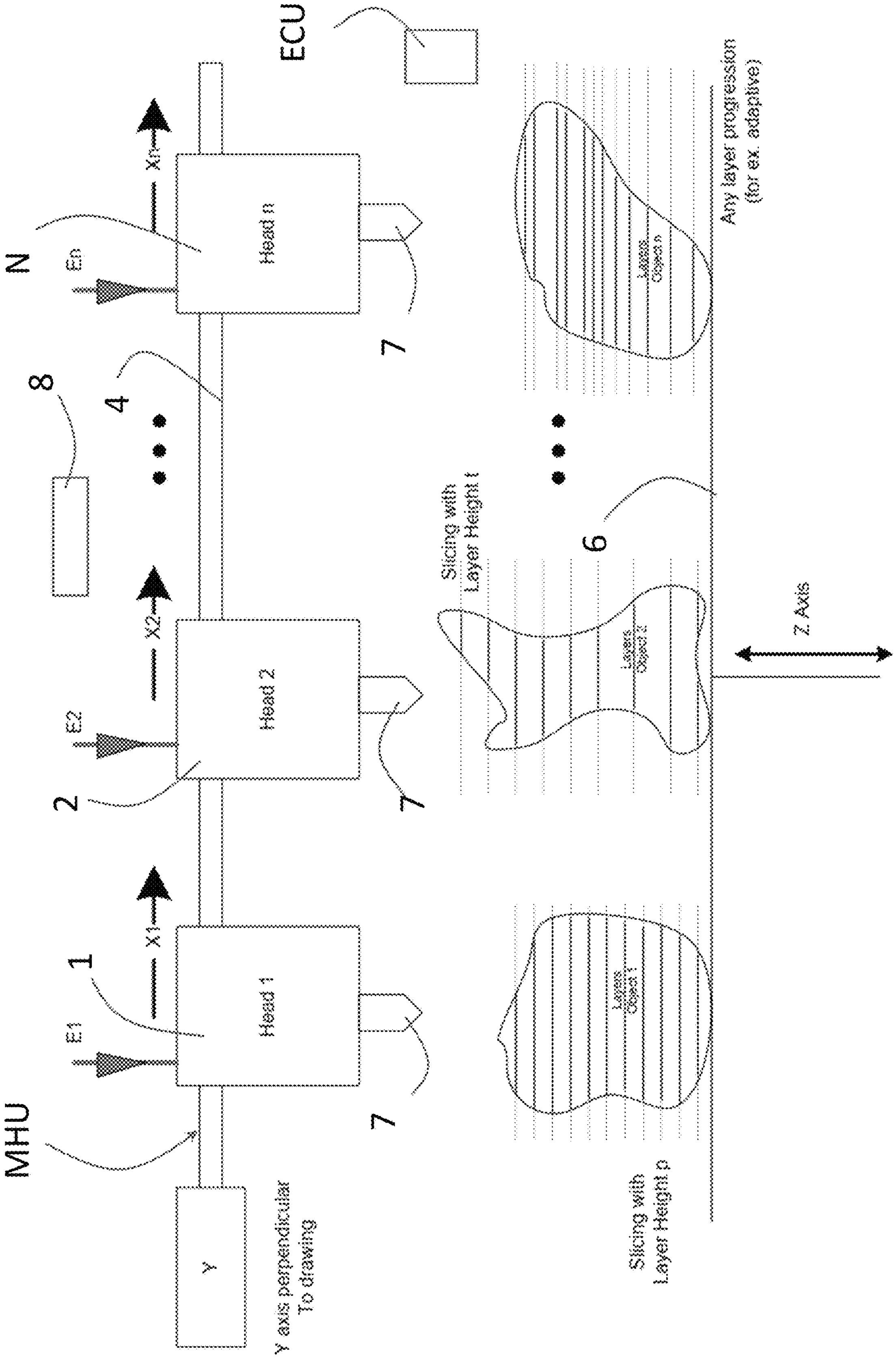
FIG. 1 is a sketch showing an example of a machine according to the present invention wherein the second direction, i.e. Y-direction, is perpendicular to X- and Z-axes.

FIG. 1 shows a preferred and not limiting embodiment of a printing machine according to the present invention wherein a multi-head unit (MHU) comprises first, second and third (or more) printing heads 1, 2, 3, 4 . . . . N, that move independently but without colliding along a single X direction, the direction being defined by a preferably rectilinear guiding beam 4.

The printing machine further comprises another guide, preferably a rectilinear guide 5 (shown in FIG. 2), along which multi-head unit MHU travels parallel to a Y-direction and a printing bed 6 that receives a filament material extruded or otherwise deposited from a nozzle 7 of each head 1, 2, N. Multi-head unit MHU is configured to move with respect to bed 6 along a Z-direction, which defines with X- and Y-direction a reference frame to express a 3D deposition or deposition path of the material via a triplet of coordinates. Preferably X-Y- and Z-axes are rectilinear and mutually orthogonal but the present invention applies to other reference frames, e.g. for polar or spherical coordinates, depending on the case. Furthermore, according to the embodiment of FIG. 1, bed 6 moves along suitable guides but it is also possible that multi-head unit MHU move along the Z-direction and bed 6 be fixed.

The printing machine further comprises actuators, e.g. electric rotary motors, to move heads 1, 2, N in the reference frame, a multi-deposition unit 8 that can process a single deposition material or a plurality of materials e.g. a material X can be fed in nozzle 7 of head 1 and an elastic material Y can be fed to nozzle 7 of head 2, which can be as well different in size, e.g. one with orifice of 0.5 mm other with 0.8 mm, with a filament-like deposition material in a softened or partially melted condition to favor shaping and deposition and an electronic control unit ECU to control, e.g. via suitable circuitry and sensors, position within the reference frame of heads 1, 2, N via the actuators and a quantity of material to each head 1, 2, N. In particular, the deposition system comprises actuators to provide a diversified deposition rate for each head. A control parameter of such actuators may be used to indicate an amount and/or rate of deposition material processed by each head, e.g. in case of extrusion, the angular position and motion of a feeding screw that feeds the respective deposition head.

As shown in FIG. 1, each head 1, 2, N prints its own object or sub-part so that material deposited by one printing head do not overlap with material deposited by another printing head.

Furthermore, FIG. 1 shows objects having different slicing. This can be obtained by e.g. having head 1 depositing every other layer and head 2 depositing every layer. When head 1 does not deposit, the relative deposition data (E1 in FIG. 3) for the given z-coordinate of the sequence where head 2 does deposit is zero. Deposition data of head 1 for the subsequent layer shall take into account the higher volume of material to be deposited in order to have a different slicing than that of head 2. More generally, while one deposition head does deposit, the non-depositing head may move or not.

Figure 2:
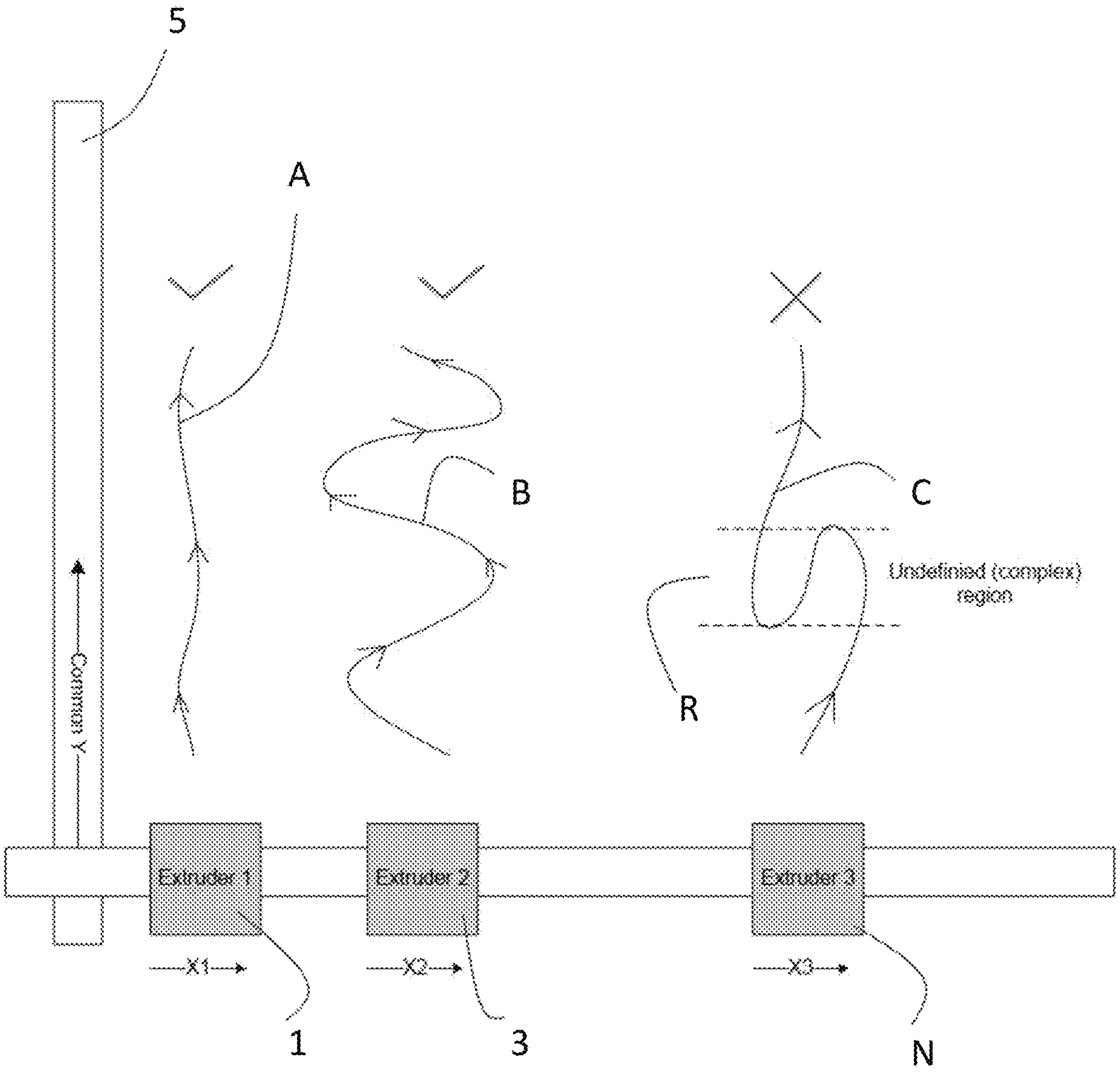
FIG. 2 is a sketch of the machine of FIG. 1 in a plane showing Y- and X-axes.

FIG. 2 shows examples of deposition paths in the non-limiting embodiment where layers are substantially planar and deposited on a geometric horizontal plane perpendicular to the Z-direction. According to an important aspect of the invention, paths A and B show different geometries that are compatible with contemporaneous deposition of both heads 1 and 2. Deposition path C has a region R that is incompatible with a contemporaneous deposition with one or both of paths A, B: in such a region only head 3 is active and deposits whilst deposition from heads 1, 2 is temporarily stopped.

As shown in FIG. 2, the toolpaths of the first and second deposition heads shall have a certain degree of similarity in order to be processed by the machine. For example, it is not possible to process a toolpath for e.g. deposition head 1 that, at a given step of the relative array, requires a negative displacement along the y axis together with another toolpath for e.g. deposition head 2, that requires a positive displacement along the y axis. FIG. 2 (and FIGS. 6A to 8) shows how coordinates along the Z and Y axis are identical between toolpath and coordinates along the X axis are different so as to generate a non-replica, non-mirrored figures or segments.

Figure 3:
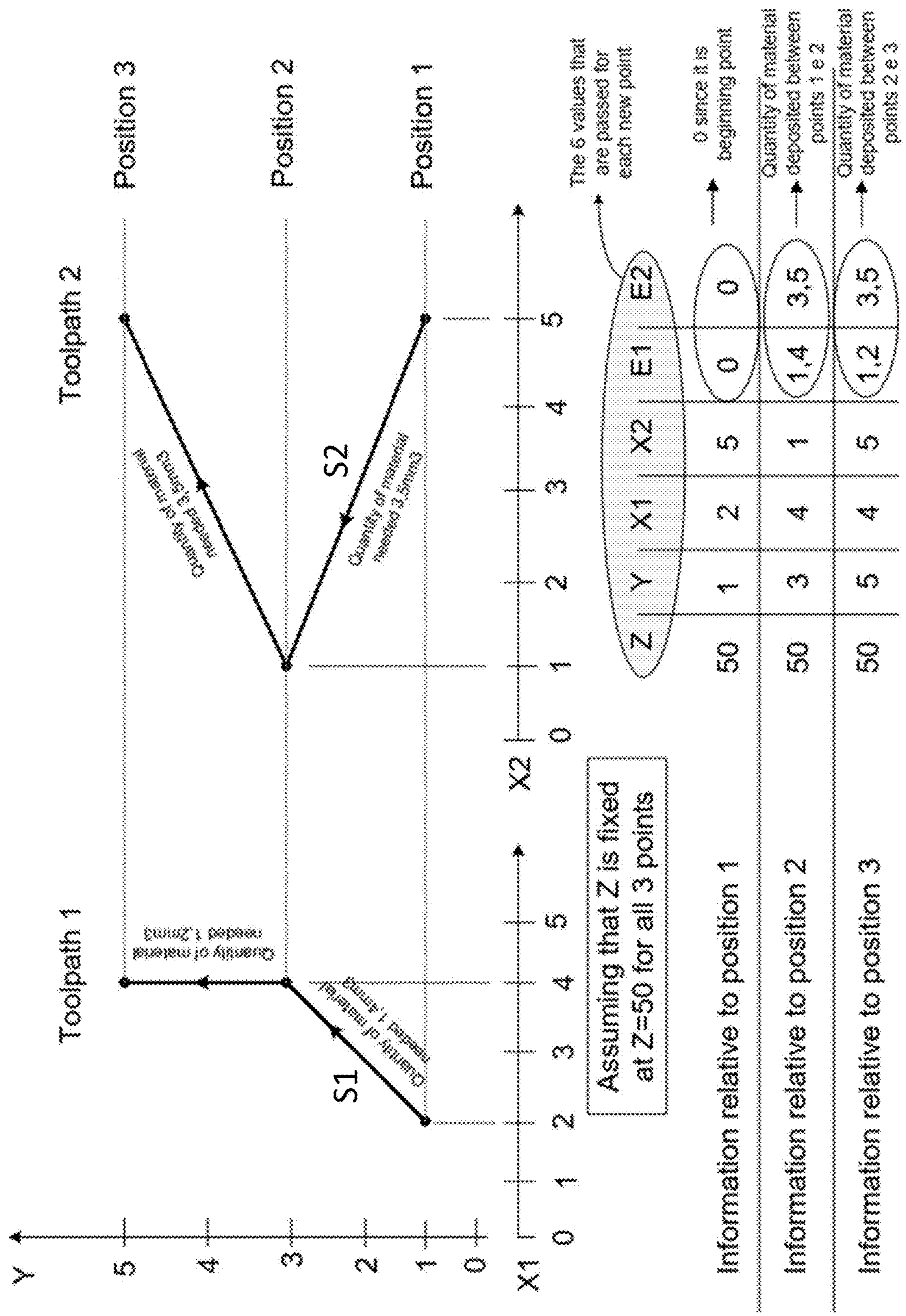
FIG. 3 is a sketch showing a preferred discretization of a first and second deposition paths.
Figure 4A:
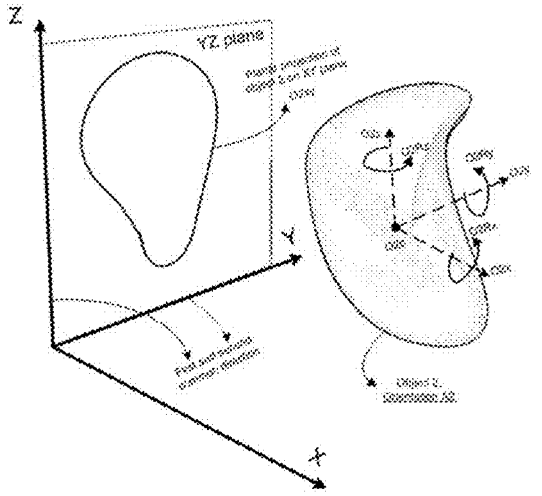
FIGS. 4A-4D and 5A-5B show sketches about a suitable orientation of 3D geometrical or numeric models of the objects/sub-parts to be printed.
Figure 4B:
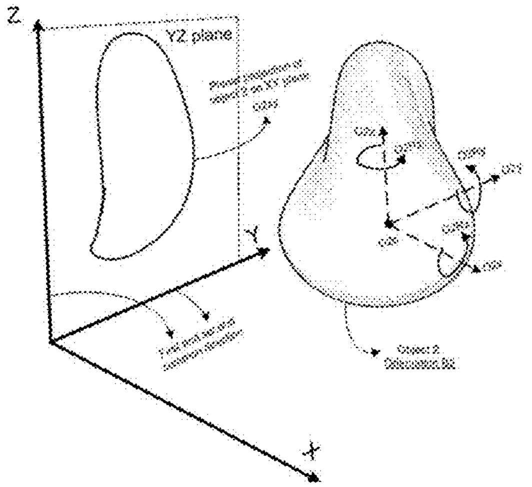
Figure 4C:
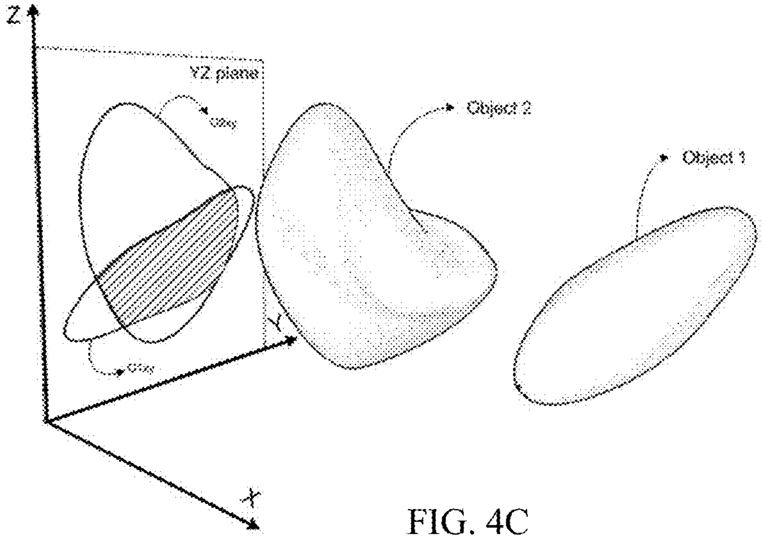
Figure 4D:
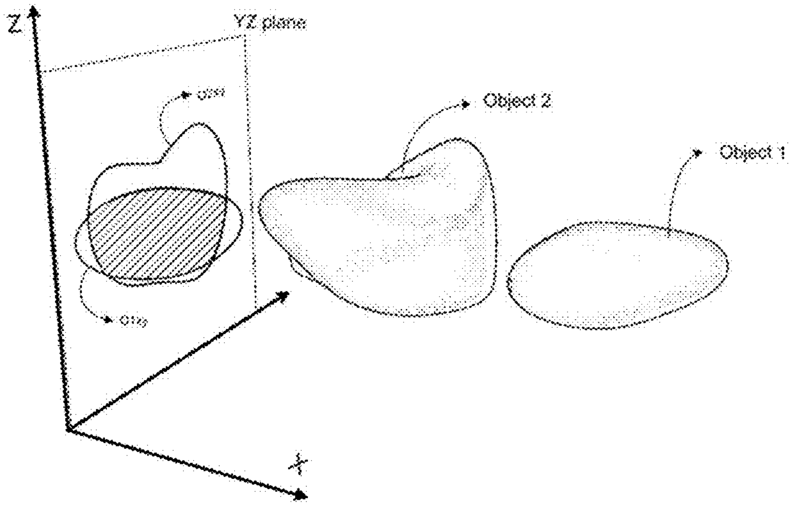

FIG. 3 shows a detail to describe a preferred programming of electronic control unit (ECU) for the definition of exemplary deposition path 1 and 2. According to a preferred embodiment, each deposition path is identified by a predefined input array or sequence comprising a first section with the triplets of coordinates of each point of an arbitrary spatial discretization applied to the preferred deposition path. As shown in FIG. 3, for heads 1 and 2 coordinates z and y are the same because the latter are provided by movements along the common guides 5 and bed 6.

Input array or sequence of FIG. 3 also comprises a section about a quantity of deposition material, preferably expressed as a volume of material, to be deposited when travelling from a starting point to and adjacent point by the relative head 1, 2.

Each row of the array includes position and, preferably, non-position information, e.g. quantity of material to be deposited, speed at a given point in space. Furthermore, array of FIG. 3 is a single sequence for both heads but it is possible to provide an array for each head, wherein, for a given row, Y and Z coordinates are identical and X coordinates as well as other non-position information are different.

Array may include both position and non-position absolute space coordinates or displacements with sign. In the latter case it is very easy to spot an inconsistency of toolpaths because it is not possible to have, at a given step of the array i.e. at a given y-coordinate, displacements of different signs for head 1 and head 2. If the array contains absolute coordinates, it is a simple algebraic step to calculate the displacement and therefore compatibility of toolpaths.

FIGS. 4A-4D and 5A-5B show a preferred embodiment of the invention wherein two shapes are oriented e.g. oriented at an angle about Z-axis in order to maximize the condition for contemporary deposition of heads 1 and 2. According to a preferred embodiment, orientation of the pair of shapes to be printed is calculated as follows:

- Calculation of centroids of first and second 3D model of the shapes to be printed, whereas a centroid is defined as a point whose position is the average or mean position of all points constituting the object.
- Orientation of local xyz reference frame centered in each centroid is operated, local reference frames being 'parallel' to machine reference frame.
- Iterative rotations about the centroids and axes of local reference frames by a preset finite angle are applied to each 3D model and respective projections on a plane defined by the first and second common directions of the deposition heads, i.e. Y-Z plane are collected (FIGS. 4A and 4B).
- All projections from first object are compared to all projections from second object on a 1-to-1 basis, by a brute force algorithm, while having their centroids aligned along X axis.
- As an output and final solution of the brute force algorithm is provided the pair of projections of first and second object that have the biggest common/overlapping area of YZ projections.
- In a case of multiple solutions that have equal or similar common area, the final solution is selected as the one having the objects in such orientation that minimize the Z coordinate.

Orienting may be either calculated onboard of the manufacturing machine, or by an external electronic device, in which case arrays take into account the optimized orientation.

Figure 5A:
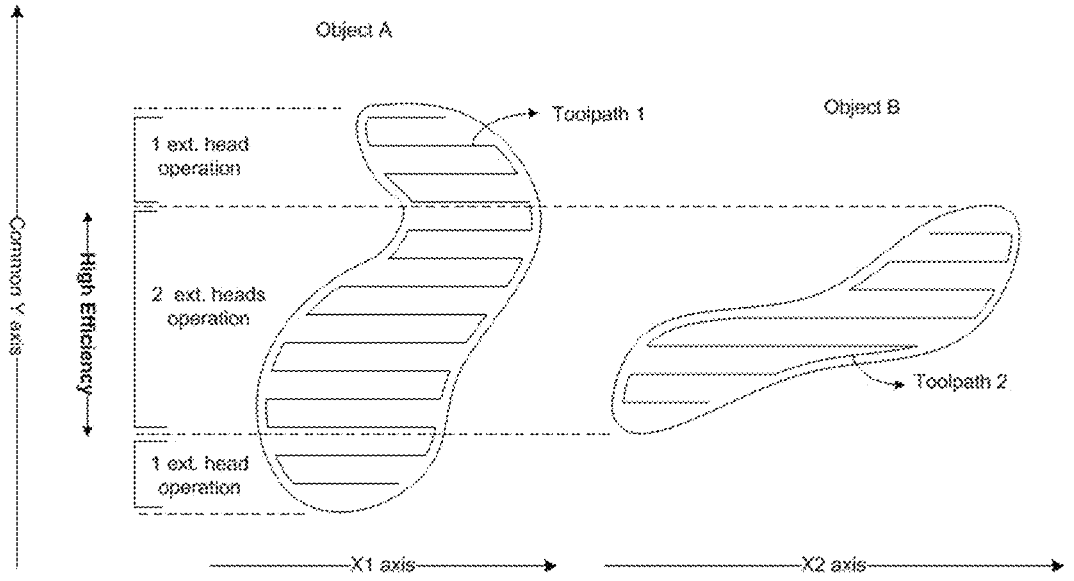
Figure 5B:
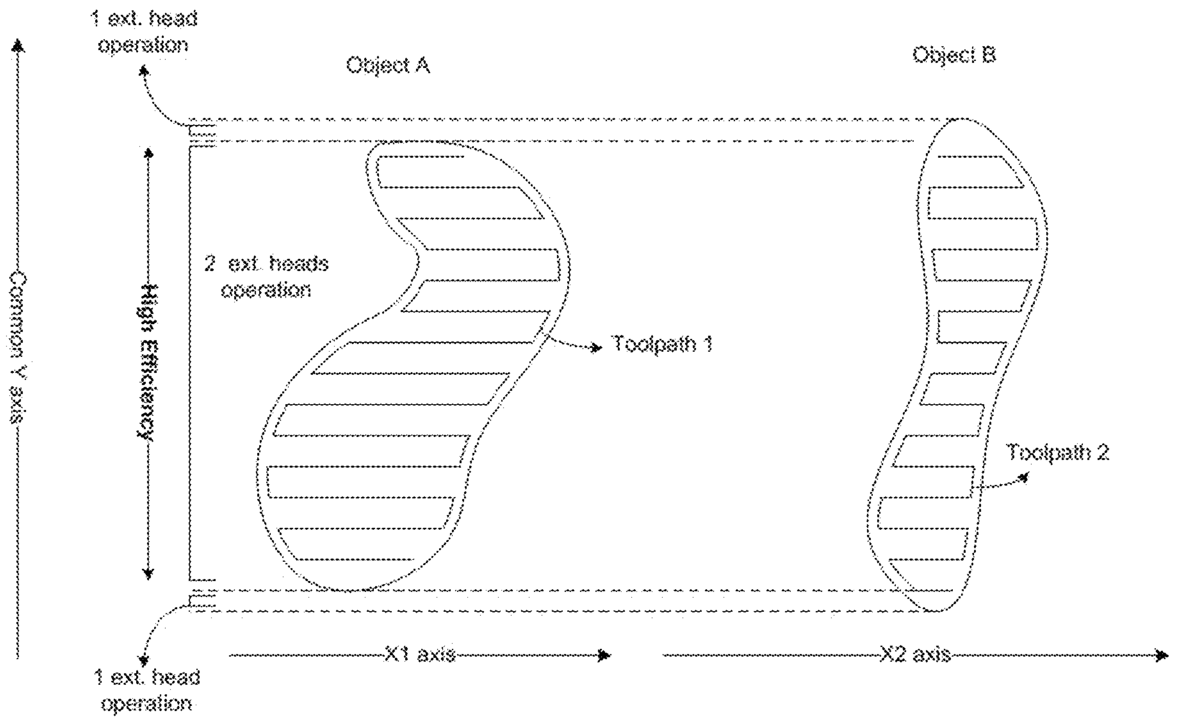

FIGS. 5A and 5B show in greater detail, within the slicing plane, a possible starting orientation of 3D models projections and a better orientation in which the synchronisation of deposition is improved (or potentially optimized). More generally, orientation is such that a parameter indicative of simultaneous deposition of two printing heads, e.g. percentage of overlapping area with respect to total area, is kept above a predefined level.

Figure 6A:
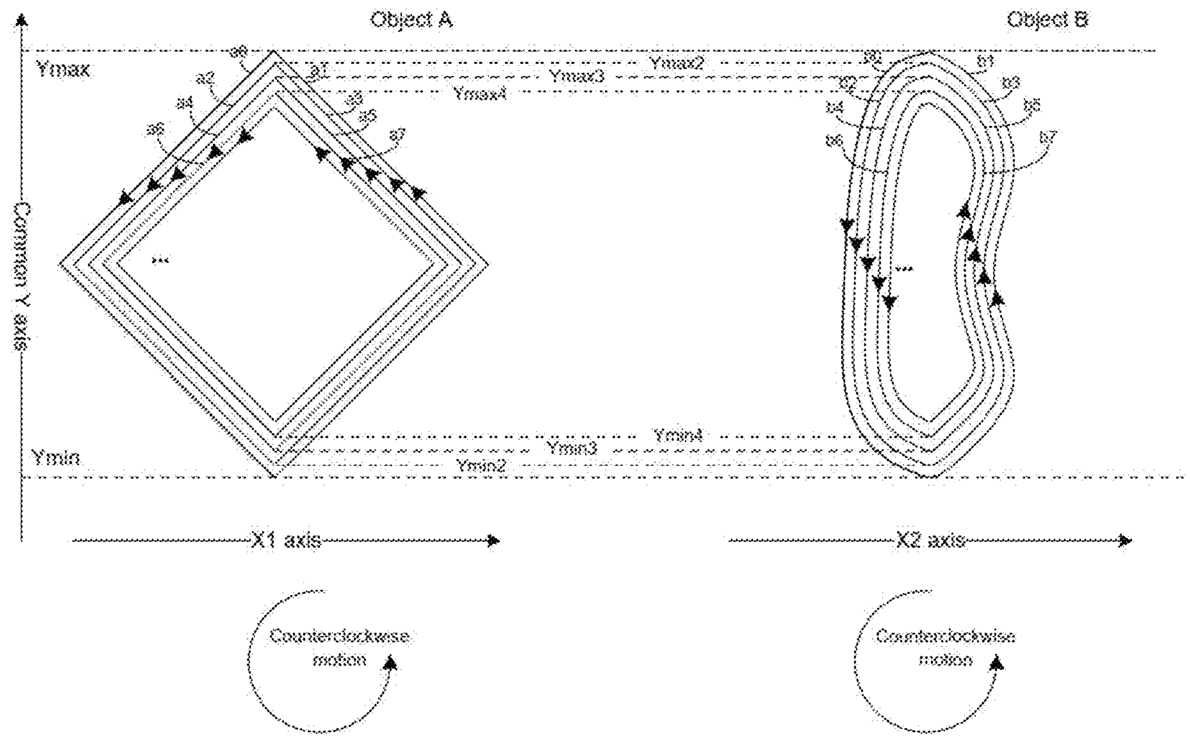
FIGS. 6A to 8 show sketches of deposition paths.

FIGS. 6A to 8 show different approaches for defining deposition path. In particular, once an optimal orientation has been defined for both of the objects, they are sliced with a horizontal plane (XY) perpendicular to the plane defined by first and second common direction (YZ). An iterative slicing between the horizontal plane (XY) and different Z height identifies the layers for which toolpaths need to be developed for example for Z=const. The height difference between the intersections defines the layer height. In particular, FIGS. 6A and 6B show how discretization step pattern has variable step values in order to provide a better definition to the shape having higher complexity. Such step pattern is common to both layers so that synchronism is maximized. As an alternative, a more general decomposition of the object is automatically operated to generate a continuous serpentine, e.g. non-constant Z coordinate, toolpath for the object as a whole. In this way, a stratification of layers having no constant Z takes place and the deposition interruptions required by constant Z layers are avoided.

In FIG. 6A, the layers of two objects A and B are shown. In this embodiment, the toolpaths are developed by first locating the Ymax and Ymin coordinate that in this example are equal for both of the objects. In a following step, the external contours of the layers obtained by the slicing in a preceding phase are split into left and right toolpaths, hereby denoted as a0 and a1 from object A and b0 and b1 from object B. The following toolpaths can be obtained by planar offset of these two toolpaths in the horizontal plane. Once the toolpaths have been developed, they are coupled in pairs for simultaneous execution, according to their Ymax and Ymin coordinates, denoted with Ymax2, Ymin2, Ymax3, Ymin3 etc. For example, a suitable pair for toolpath a0 could be found by analysing the respective Ymax and Ymin coordinates of all toolpaths from Object B and selecting the toolpath with most similar or identical Ymax and Ymin to the ones from a0, thus minimising the average error between corresponding extreme coordinates, resulting in both b0 and b1 as a possible solution in the example shown in FIG. 6A. In such a case of multiple solutions, an applicable criterion for pairing is to pair left offset toolpaths of Object A, obtained as a result from offsetting a0 to left offset toolpaths of Object B, obtained as a result from offsetting b0. This is presented in FIG. 6A, where the toolpaths have been paired in the following way: [a0,b0], [a1,b1], [a2,b2], [a3,b3] etc. During the manufacturing phase using this method, a simultaneous deposition of two deposition heads will take place in such way that deposition head 1 will follow the toolpaths belonging to Object A from the pairs, while deposition head 2 will follow the toolpaths belonging to Object B from the pairs. Furthermore, such figure shows how deposition heads 1, 2 deposit in a coordinated, continuous and simultaneous manner.

When using this multi-deposition method, an additional parameter of direction of Y axis (common direction) needs to be defined. In this example the pair [a0,b0] is being executed with a direction of movement of the common Y axis from Ymax to Ymin as indicated by the arrow, followed by a direction of movement from Ymin to Ymax of the common axis during execution of the second pair of toolpaths [a1,b1] as indicated by the arrows, thus causing a counterclockwise motion on both deposition head 1 and deposition head 2, maximising the relative distance between them, and consequently their thermal and airflow independence. In another example, where the toolpaths are paired as first pair [a0,b1] and second pair [a1, b0], while maintaining the same common direction from Ymax to Ymin for the first pair, and from Ymin to Ymax for the second pair, the motion of deposition head 2 would be clockwise, conversely to the counterclockwise motion of deposition head 1, thus countering its inertial forces, ultimately resulting in a dynamically more balanced system of the entire apparatus. These thermal or mechanical dynamics of the apparatus as described in this invention can be used as further criteria for defining the specific combination of toolpath pairs and common direction for process execution. The process of toolpath generation and pairing and/or common direction selection is then repeated, according to a given criteria similar to the ones described above, until a desired infill percentage of the layer is obtained. In some examples, the developed toolpaths can only consist of a certain number of contour offsets (also known as walls) without filling the rest of the layer.

Besides the preparation of the toolpaths in such a way that would enable execution using the multi-head deposition method, the process needs to be strictly controlled and synchronised in order to guarantee the correct geometrical deposition of the required toolpaths, while satisfying the constraints that common Y direction is shared for both of the deposition heads.

It is important that the control unit ensures correct interpolation of the required curves in a coordinated and synchronous way. In one example, this synchronicity can be achieved by a linear interpolation of points obtained by required sampling of the said curves. In such an example, every sampling point on any of the curves would require a sampling point on the other toolpath from the corresponding pair. Sampling points are collected in arrays as described above e.g. about FIG. 3.

Figure 6B:
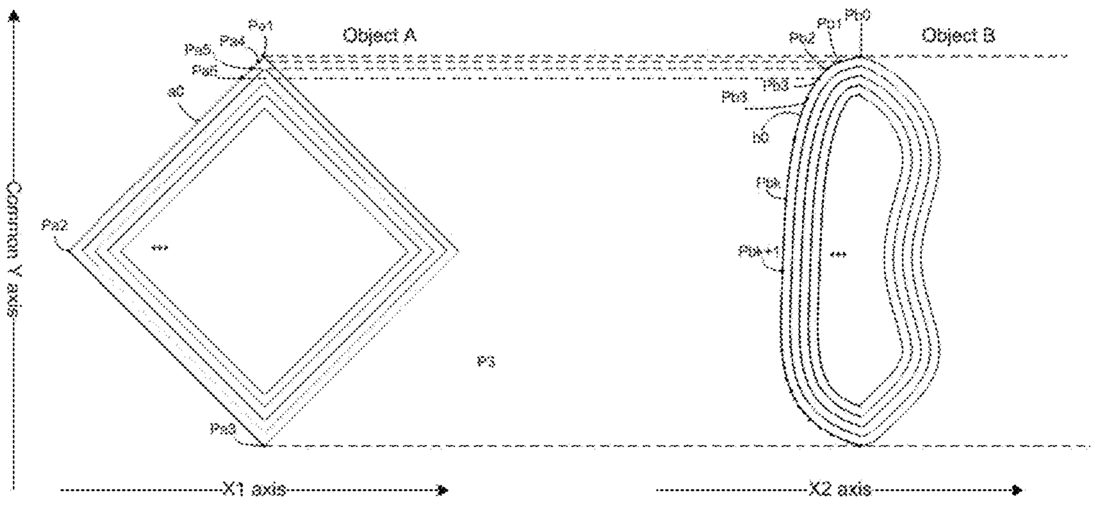

For example, reference can be made to FIG. 6B where for an accurate representation of curve a0, three points Pa1, Pa2 and Pa3 would suffice. However, for accurate representation of the other curve in the corresponding pair, b0, more points might be necessary: Pb1, Pb2, Pb3, Pb4 etc. In such an example, the toolpath (or better CAM preparation) would need to also find suitable sampling points of curve a0, by for example a projection algorithm and locate points: Pa4, Pa5, Pa6 in order to specify the movement of the deposition heads in every point necessary for either of the curves.

It should be noted that such additional sampling points might not always be necessary due to accurate geometrical representation, but also due to examples where the material deposition needs to be controlled as for example, in areas where the deposition on one of the deposition heads needs to be stopped or initiated.

Figure 7A:
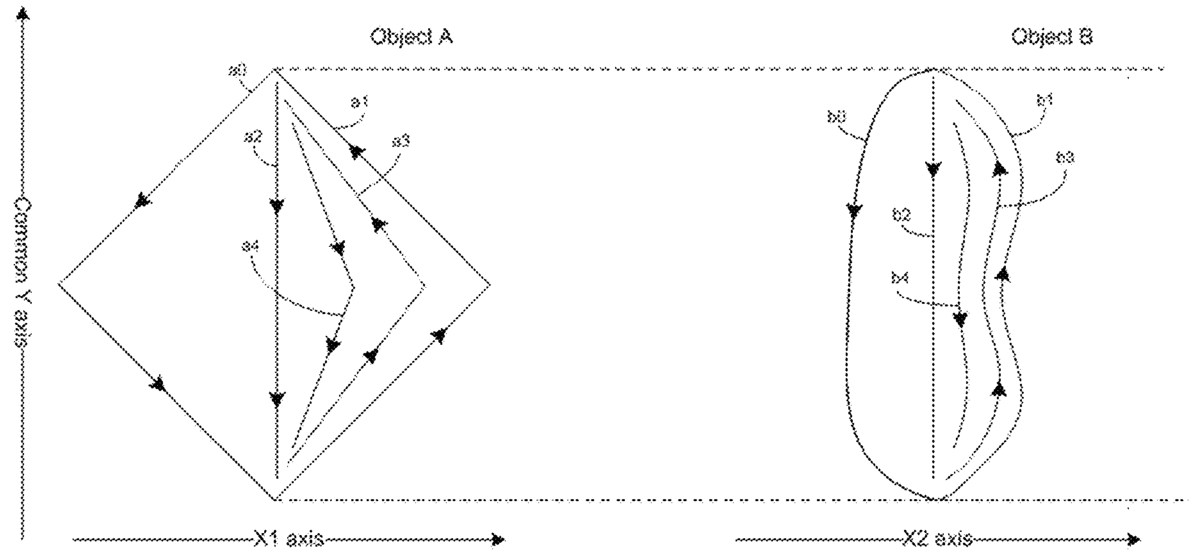

In another embodiment represented in FIG. 7A, cross sections of Object A and Object B can be decomposed in suitable toolpaths following more complex algorithms for curve generation. In such an example, a mid-line toolpath has been generated by connecting the Ymax and Ymin points of each cross section of the corresponding objects, denoted as a2 and b2 in FIG. 7A. The rest of the toolpaths can then be generated according to algorithms for morph curve (also known as tween curve) given a specific distance based on infill density, where the newly generated curves are generated as a weighted average of boundary curves, and where the weight is the distance from the boundary curves. For example, b3 and b4 are morph curves when using curves b1 and b2 curves as boundaries, and curves a3 and a4 are morph (tween) curves when using a1 and a2 as boundaries. FIG. 7A shows how, according to the invention, corresponding segments a4 and b4 have different lengths and are deposited in the same time interval, i.e. are non-replica segments.

Figure 7B:
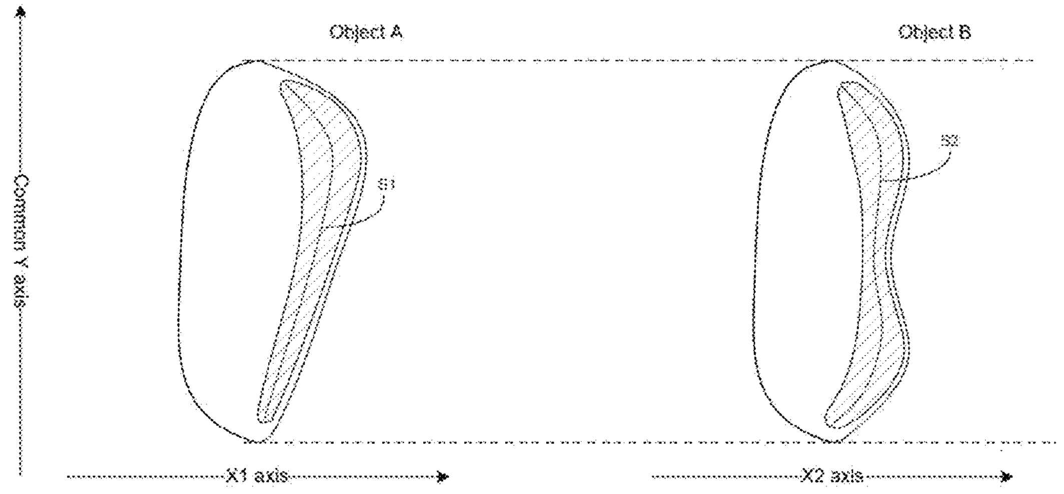
Figure 8:
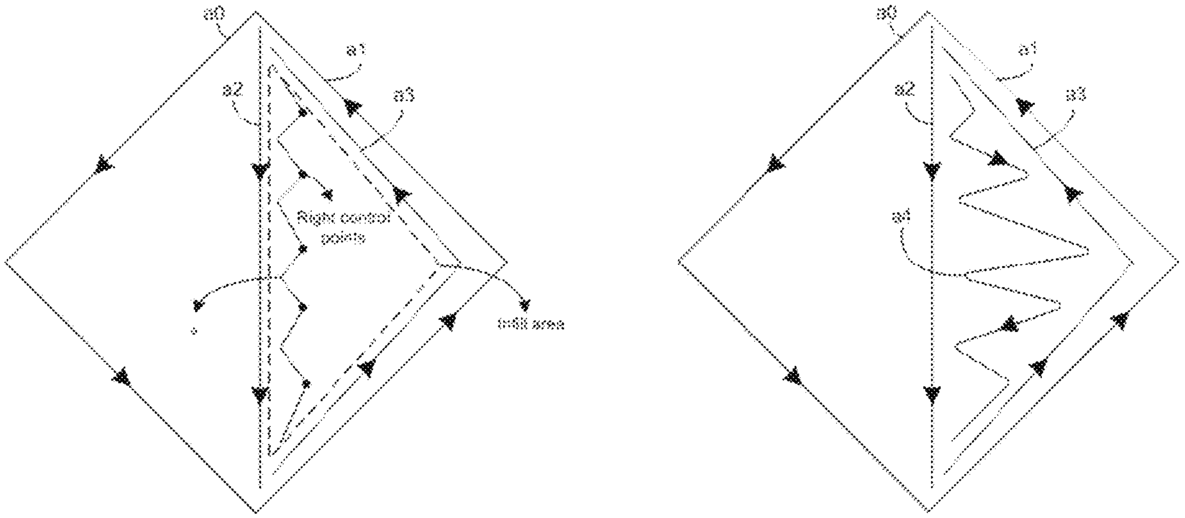

In such an example, the distance between adjacent toolpaths varies, so it can, for example, be particularly advantageous to provide deposition data relative to a varying filament width on a segment-to-segment basis, based on such toolpath distance, by controlling the amount of material deposited along the toolpaths, represented by the areas in pattern, depicted in FIG. 7B. Such figure shows how corresponding segments, S1 and S2 are deposited synchronously during the same time interval to cover respectively different areas by a variation of the filament width. The control over width is beneficial as a further degree of freedom for the designer in order to extend the number of non-replica geometries that can be printed by the machine.

In yet another example, the geometry of some toolpaths may not be related to the geometry of the cross-section with such a high level of similarity, but might be obtained by populating the cross-section of the object by toolpaths from a pre-made database of toolpaths, depending on the area that needs to be infilled by toolpaths, and adjusting it to that infilled area. For example, in FIG. 8 toolpath a4 has been obtained by using a template zig-zag curve a', where all right hand control points of that curve have been extended in X direction until intersection with the infill area.

The above described examples of different types of toolpaths and toolpath pairs between various objects can be combined in the deposition of layers.

It is important to note that speed of heads during deposition can be calculated by the control unit in a number of different ways. For example, an initial speed is assigned to each deposition head and such speed is maintained until the array specifies a different value in case such speed is always less than a maximum speed of the machine. Otherwise, the array further comprises a specific column for the speed to be kept at each step, i.e. between adjacent points along the deposition path. It is important to note that speed of a deposition head is defined by kinematic constraints, e.g. performances of actuators dedicated to move the head in the space or along a plane parallel to the deposition plane.

Figure 9:
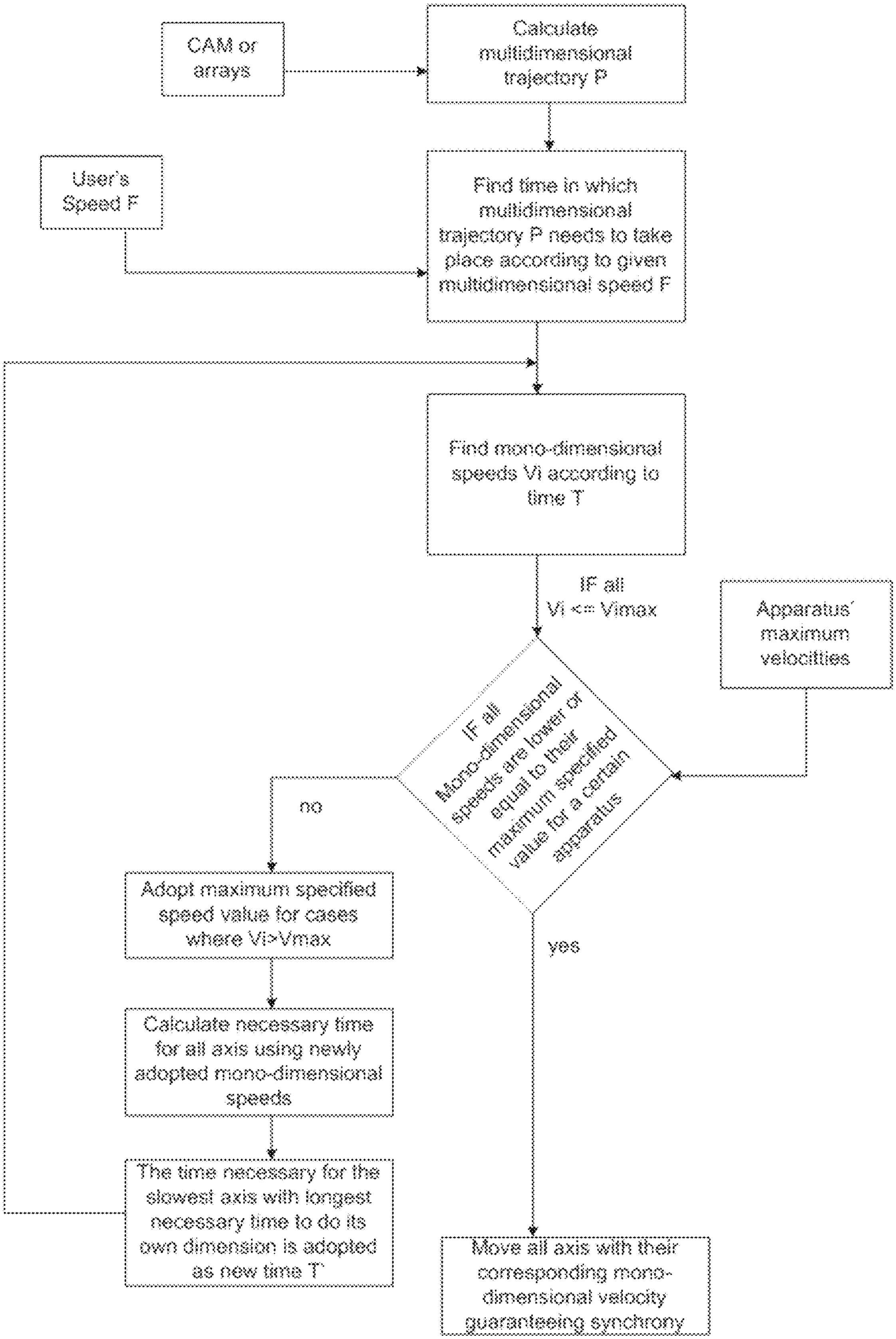
FIGS. 9 and 10 are flow-charts in a more general and two-head configuration for the calculation of operating parameters such as speed of the heads during printing.
Figure 10:
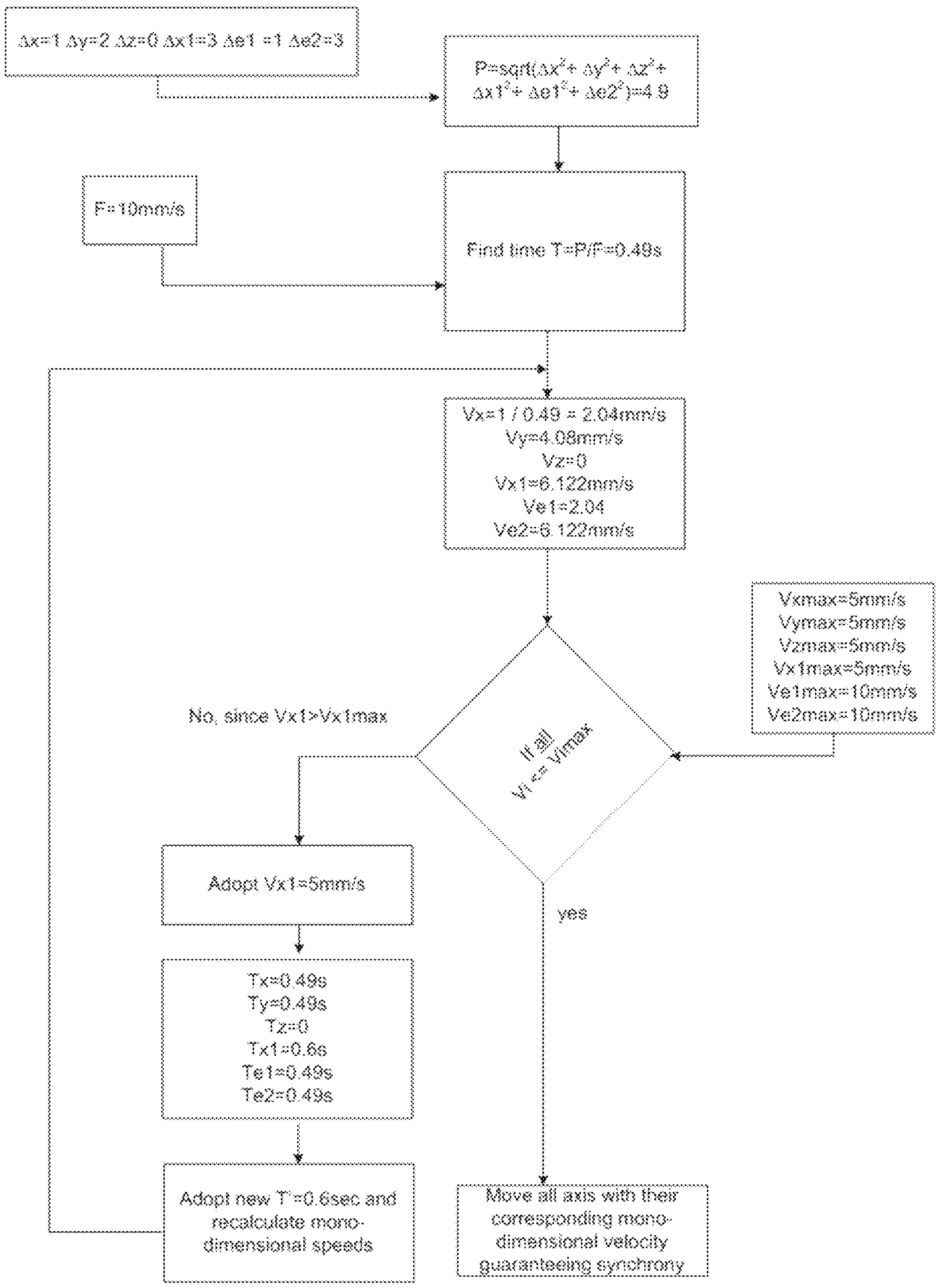

In FIGS. 9 and 10, an algorithm or dataflow is given as example on how to manage the speed for all of the separate axes based on the array data, specifically the relative value between two points in the array, the speed specified by the designer or user and the maximum capabilities in terms of permitted speeds for each of the axes of the apparatus. In particular, a maximum speed for each direction may be either a nominal speed of the relative actuator or a maximum speed stored as such in the electronic control unit.

Figure 11:
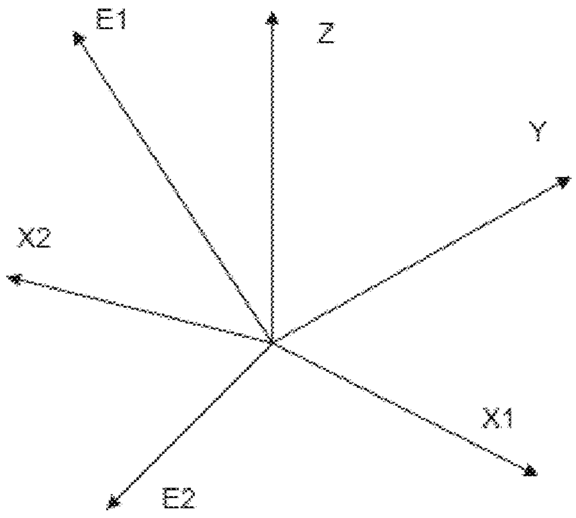
FIG. 11 is a vectorial decomposition of a quantity discussed in FIGS. 9 and 10.

FIG. 11 shows the multi-dimensional reference frame wherein 'displacement' vector P and 'speed' vector F are defined and whose length or norm is mentioned in FIG. 9. Such vectors comprise the combination of position information and non-position information, e.g. a numerical parameter indicative of the quantity of material to be deposited by each printing head for the given step of deposition defined by adjacent point in the array E1, E2. Such parameter may be a length [mm] of filament-like material to be deposited between two adjacent points of the array, an angle of rotation of a filament-like material feeding device or the like. Each row of the array defines a mono-dimensional component that combines with other mono-dimensional components to generate multi-dimensional vector P. Therefore any row of the array provides information to generate a multi-dimensional vector P.

Vector F is set by the designer in various manners, e.g. is assigned at the beginning of a layer and kept constant or changes every e.g. 10 rows of the array etc. and vector P includes the operating position coordinates between a starting point and a target point of deposition heads along the respective toolpath, the starting and target points being adjacent along the array of coordinates and material deposition parameters.

According to an embodiment, both P and F shall be expressed by the same formula, for example the norm. Dividing norm of vector P by norm of vector F provides a time that shall be common to all actuators along the axes and deposition system to guarantee a simultaneous motion. Dividing the difference between the position coordinates and material quantity of the target point and the starting point by such common time provides the speed along each axis and deposition rates for each deposition head. In case one of such values is higher than a pre-set maximum value for a given axis or deposition system, such pre-set value is chosen by the control unit as the actual speed or rate value (left branch in flowcharts of FIGS. 9 and 10) and the speed along the remaining axes and rates of the remaining deposition heads is calculated, in particular decreased, to satisfy the condition to simultaneously reach the coordinates of the target point. According to a preferred embodiment this is achieved by calculating a new time based on the actual (maximum) speed or rate and, with such new time, calculate the speeds along those axes or the deposition rates of the heads that were not above the pre-set value.

What is claimed is:

1. A multi-head additive manufacturing machine comprising:

a first common guide aligned to a first direction;

a second common guide aligned to a second direction;

a multi-deposition unit comprising at least a first deposition device and a second deposition device, wherein the first deposition device and the second deposition device are independently actuatable to provide different quantities of deposition material;

a multi-head unit (MHU) movable with respect to the first common guide and the second common guide and comprising at least a first motorized deposition head and a second motorized deposition head movable with respect to one another along a third guide aligned to a third direction, the first direction, the second direction and the third direction defining a three-dimensional reference frame for deposition; wherein the first motorized deposition head and the second motorized deposition head comprise a first opening and a second opening, respectively, wherein the deposition material provided by the first deposition device and the second deposition device is deposited through the first opening and the second opening, respectively;

an electronic control unit (ECU) programmed to:

control a movement of the first motorized deposition head and the second motorized deposition head via actuators within the three-dimensional reference frame by processing at least a discretized sequence of coordinate value sets within the three-dimensional reference frame representing a pre-defined first deposition path and a pre-defined second deposition path for the first motorized deposition head and the second motorized deposition head as a plurality of points, respectively;

provide, via a pre-defined first deposition quantity information for the first motorized deposition head and a second deposition quantity information for the second motorized deposition head, each of the pre-defined first deposition quantity information and the second deposition quantity information being associated to the plurality of points, a pre-defined quantity of material to be deposited along the pre-defined first deposition path and the pre-defined second deposition path via the first opening and the second opening and a deposition system;

wherein the first motorized deposition head and the second motorized deposition head are controlled with identical movements along the first direction and the second direction, wherein the coordinate values further include first position information along the third direction for the first motorized deposition head and second position information along the third direction for the second motorized deposition head such that, for at least a section of the discretized sequence where the first motorized deposition head and the second motorized deposition head simultaneously deposit, the pre-defined first deposition path and the pre-defined second deposition path describe a first segment and a second segment, respectively, wherein the first segment and the second segment are arbitrarily different, non-mirrored, non-replica, and the first segment and the second segment having, for a first span along the first direction and for a second span along the second direction, a corresponding first length associated to the first motorized deposition head and a corresponding second length associated to the second motorized deposition head so that a length of the first segment is different from a length of the second segment, the electronic control unit coordinating the first motorized deposition head and the second motorized deposition head by operating the actuators and the deposition system so that, when the first motorized deposition head and the second motorized deposition head simultaneously operate based on the section, each coordinate value set of the discretized sequence having identical coordinate values along the first direction and the second direction and different values along the third direction and for first deposition information and second deposition information, is simultaneously reached by the first motorized deposition head and the second motorized deposition head so that the first segment and the second segment are synchronously deposited over a same time interval by having a first travelling speed of the first motorized deposition head lower than a second travelling speed of the second motorized deposition head when the first segment is shorter than the second segment.

2. The multi-head additive manufacturing machine according to claim 1, wherein the discretized sequence processed by the electronic control unit is configured to define a first pre-defined discretization step along the first direction and a second pre-defined discretization step along the second direction between adjacent coordinate value sets and wherein at least one of a plurality of pre-defined first discretization steps and a plurality of pre-defined second discretization steps have non-constant discretization step values along the section, the plurality of pre-defined first discretization steps and the plurality of pre-defined second discretization steps being applied together to the pre-defined first deposition path and the pre-defined second deposition path so that the pre-defined first deposition path and the pre-defined second deposition path have a same discretization along the first direction and the second direction.

3. The multi-head additive manufacturing machine according to claim 2, wherein the electronic control unit is programmed so that, when two or more stratified layers of a printed object or a sub-part are at least partially defined by the pre-defined first deposition path and the pre-defined second deposition path, the pre-defined first deposition path of the first motorized deposition head of a lower layer is not overlapped by the pre-defined second deposition path of the second motorized deposition head of a higher layer and the pre-defined second deposition path of the lower layer is not overlapped by the pre-defined first deposition path of the higher layer.

4. The multi-head additive manufacturing machine according to claim 2, wherein at least within the section each point of the discretized sequence is defined by at least six degrees of freedom including first position information along the first direction, second position information along the second direction, third position information of the first deposition head along the third direction, fourth position information of the second deposition head along the third direction, the first deposition information and the second deposition information and wherein the electronic control unit is programmed to:

check if an inputted preferred speed value including deposition rates of the first motorized deposition head and the second motorized deposition head is compatible with a set of pre-defined speed values, each pre-defined speed value being associated to a respective degree of freedom;

when an inputted speed is, along at least an axis or for the deposition system, higher than a relative pre-defined speed value or deposition rate, choose the relative pre-defined speed or deposition rate as a maximum speed or rate along a relative direction or associated to the first motorized deposition head and the second motorized deposition head; and calculate other speed values along other axes or remaining deposition rate so that the first motorized deposition head and the second motorized deposition head simultaneously reach a target point.

5. The multi-head additive manufacturing machine according to claim 2, wherein the first deposition information and the second deposition information are different so that, between adjacent points of the discretized sequence, the electronic control unit causes a first width of material deposited at a given time by the first motorized deposition head for the first segment to be different from a second width of material deposited for the second segment by the second motorized deposition head so that a first area covered by the first segment is different from a second area covered by the second segment in width and/or in length.

6. The multi-head additive manufacturing machine according to claim 2, wherein the first deposition information and the second deposition information are different so that the electronic control unit causes the first motorized deposition head to be deactivated from deposition while the second motorized deposition head is depositing and causes the first motorized deposition head to deposit again while the second motorized deposition head is depositing, wherein a thickness for the deposited material of the first motorized deposition head is obtained and higher than a thickness for the deposited material of the second motorized deposition head.

7. The multi-head additive manufacturing machine according to claim 1, wherein the electronic control unit is programmed so that, when two or more stratified layers of a printed object or a sub-part are at least partially defined by the pre-defined first deposition path and the pre-defined second deposition path, the pre-defined first deposition path of the first motorized deposition head of a lower layer is not overlapped by the pre-defined second deposition path of the second motorized deposition head of a higher layer and the pre-defined second deposition path of the lower layer is not overlapped by the pre-defined first deposition path of the higher layer.

8. The multi-head additive manufacturing machine according to claim 7, wherein at least within the section each point of the discretized sequence is defined by at least six degrees of freedom including first position information along the first direction, second position information along the second direction, third position information of the first deposition head along the third direction, fourth position information of the second deposition head along the third direction, the first deposition information and the second deposition information and wherein the electronic control unit is programmed to:

check if an inputted preferred speed value including deposition rates of the first motorized deposition head and the second motorized deposition head is compatible with a set of pre-defined speed values, each pre-defined speed value being associated to a respective degree of freedom;

when an inputted speed is, along at least an axis or for the deposition system, higher than a relative pre-defined speed value or deposition rate, choose the relative pre-defined speed or deposition rate as a maximum speed or rate along a relative direction or associated to the first motorized deposition head and the second motorized deposition head; and calculate other speed values along other axes or remaining deposition rate so that the first motorized deposition head and the second motorized deposition head simultaneously reach a target point.

9. The multi-head additive manufacturing machine according to claim 7, wherein the first deposition information and the second deposition information are different so that, between adjacent points of the discretized sequence, the electronic control unit causes a first width of material deposited at a given time by the first motorized deposition head for the first segment to be different from a second width of material deposited for the second segment by the second motorized deposition head so that a first area covered by the first segment is different from a second area covered by the second segment in width and/or in length.

10. The multi-head additive manufacturing machine according to claim 7, wherein the first deposition information and the second deposition information are different so that the electronic control unit causes the first motorized deposition head to be deactivated from deposition while the second motorized deposition head is depositing and causes the first motorized deposition head to deposit again while the second motorized deposition head is depositing, wherein a thickness for the deposited material of the first motorized deposition head is obtained and higher than a thickness for the deposited material of the second motorized deposition head.

11. The multi-head additive manufacturing machine according to claim 1, wherein at least within the section each point of the discretized sequence is defined by at least six degrees of freedom including first position information along the first direction, second position information along the second direction, third position information of the first deposition head along the third direction, fourth position information of the second deposition head along the third direction, the first deposition information and the second deposition information and wherein the electronic control unit is programmed to:

check if an inputted preferred speed value including deposition rates of the first motorized deposition head and the second motorized deposition head is compatible with a set of pre-defined speed values, each pre-defined speed value being associated to a respective degree of freedom;

when an inputted speed is, along at least an axis or for the deposition system, higher than a relative pre-defined speed value or deposition rate, choose the relative pre-defined speed or deposition rate as a maximum speed or rate along a relative direction or associated to the first motorized deposition head and the second motorized deposition head; and calculate other speed values along other axes or remaining deposition rate so that the first motorized deposition head and the second motorized deposition head simultaneously reach a target point.

12. The multi-head additive manufacturing machine according to claim 11, wherein the first deposition information and the second deposition information are different so that, between adjacent points of the discretized sequence, the electronic control unit causes a first width of material deposited at a given time by the first motorized deposition head for the first segment to be different from a second width of material deposited for the second segment by the second motorized deposition head so that a first area covered by the first segment is different from a second area covered by the second segment in width and/or in length.

13. The multi-head additive manufacturing machine according to claim 11, wherein the first deposition information and the second deposition information are different so that the electronic control unit causes the first motorized deposition head to be deactivated from deposition while the second motorized deposition head is depositing and causes the first motorized deposition head to deposit again while the second motorized deposition head is depositing, wherein a thickness for the deposited material of the first motorized deposition head is obtained and higher than a thickness for the deposited material of the second motorized deposition head.

14. The multi-head additive manufacturing machine according to claim 1, wherein the first deposition information and the second deposition information are different so that, between adjacent points of the discretized sequence, the electronic control unit causes a first width of material deposited at a given time by the first motorized deposition head for the first segment to be different from a second width of material deposited for the second segment by the second motorized deposition head so that a first area covered by the first segment is different from a second area covered by the second segment in width and/or in length.

15. The multi-head additive manufacturing machine according to claim 14, wherein the first deposition information and the second deposition information are different so that the electronic control unit causes the first motorized deposition head to be deactivated from deposition while the second motorized deposition head is depositing and causes the first motorized deposition head to deposit again while the second motorized deposition head is depositing, wherein a thickness for the deposited material of the first motorized deposition head is obtained and higher than a thickness for the deposited material of the second motorized deposition head.

16. The multi-head additive manufacturing machine according to claim 1, wherein the first deposition information and the second deposition information are different so that the electronic control unit causes the first motorized deposition head to be deactivated from deposition while the second motorized deposition head is depositing and causes the first motorized deposition head to deposit again while the second motorized deposition head is depositing, wherein a thickness for the deposited material of the first motorized deposition head is obtained and higher than a thickness for the deposited material of the second motorized deposition head.

17. A manufacturing method for two or more objects or sub-parts with a multi-head additive manufacturing machine, wherein the multi-head additive manufacturing machine comprises:

a first common guide aligned to a first direction;

a second common guide aligned to a second direction;

a multi-deposition unit comprising at least of a first deposition device and a second deposition device, wherein the first deposition device and the second deposition device are independently actuatable to provide different quantities of deposition material; and a multi-head unit (MHU) movable with respect to the first common guide and the second common guide and comprising at least a first motorized deposition head and a second motorized deposition head movable with respect to one another along a third guide aligned to a third direction, the first direction, the second direction and the third direction defining a three-dimensional reference frame for deposition; wherein the first motorized deposition head and the second motorized deposition head comprise a first opening and a second opening, respectively, wherein the deposition material provided by the first deposition device and the second deposition device is deposited through the first opening and the second opening, respectively;

the manufacturing method comprising steps of:

via an electronic control unit (ECU), receiving at least a discretized sequence of coordinate value sets within the three-dimensional reference frame representing predefined first and second deposition paths for the first motorized deposition head and the second motorized deposition head as a plurality of points, respectively;

providing, via a pre-defined first deposition quantity information for the first motorized deposition head and a second deposition quantity information for the second motorized deposition head, each of the pre-defined first deposition quantity information and the second deposition quantity information being associated to the plurality of points, a pre-defined quantity of material to be deposited along the first and second deposition paths via the first opening and the second opening and a deposition system; and controlling predetermined movements within the three-dimensional reference frame of the first motorized deposition head and the second motorized deposition head along the third direction to implement the first and second deposition paths, wherein the first motorized deposition head and the second motorized deposition head are controlled with identical movements along the first direction and the second direction, wherein the coordinate values further include first position information along the third direction for the first motorized deposition head and second position information along the third direction for the second motorized deposition head such that, for at least a section of the discretized sequence where the first motorized deposition head and the second motorized deposition head simultaneously deposit, the first and second deposition paths describe a first segment and a second segment, respectively, wherein the first segment and the second segment are arbitrarily different, non-mirrored, non-replica, and the first segment and the second segment having, for a first span along the first direction and for a second span along the second direction, a corresponding first length associated to the first motorized deposition head and a corresponding second length associated to the second motorized deposition head so that a length of the first segment is different from a length of the second segment, the electronic control unit coordinating the first motorized deposition head and the second motorized deposition head by operating the actuators and the deposition system so that, when the first motorized deposition head and the second motorized deposition head simultaneously operate based on the section, each coordinate value set of the discretized sequence having identical coordinate values along the first direction and the second direction and different values along the third direction and for first deposition information and second deposition information, is simultaneously reached by the first motorized deposition head and the second motorized deposition head so that the first segment and the second segment are synchronously deposited over a same time interval by having a first travelling speed of the first motorized deposition head lower than a second travelling speed of the second motorized deposition head when the first segment is shorter than the second segment.

18. The manufacturing method according to claim 17, comprising the step of generating, on the plane of a first axis and a second axis, a first projection and a second projection of respective first and second 3D computational models of a relative object or a sub-part, the relative object or the sub-part is to be deposited by the first motorized deposition head or the second motorized deposition head; calculating a parameter indicative of overlapping between the first projection and the second projection; changing a relative orientation between the first and second 3D computational models within the three-dimensional reference frame until a target orientation is found such that a parameter reaches a predefined threshold; generating the discretized sequence based on the target orientation to define a portion of each of the relative object or the sub-part, the deposition of the relative object or the sub-part is operated with the first motorized deposition head and the second motorized deposition head depositing at a same time via sequences generating the first segment and the second segment.

19. The manufacturing method according to claim 17, further comprising steps of:

receiving a single or plurality of first discretized toolpaths originated by a decomposition of a first computational model of one of the at least two objects and a single or plurality of second discretized toolpaths originated by a decomposition of a second computational model of another of the at least two objects, a common discretization step pattern being applied between adjacent points of a first discretized toolpath and a second discretized toolpath where the first motorized deposition head and the second motorized deposition head simultaneously deposit;

pairing at least one of the first discretized toolpaths with at least one of the second discretized toolpaths in ordered sequential pairs based on the common discretization step pattern, for each of the ordered sequential pairs, defining a common direction of travel along the first direction and the second direction to generate the discretized sequence.

20. The manufacturing method according to claim 17, wherein the at least two objects are paired objects and the at least two objects and sub-parts are wearable by an individual and comprising the step of generating a first 3D computational model and a second 3D computational model of one or more body portions of the individual based on an output by a biometric device and generating and/or selecting a proper sequence based on the first 3D computational model and the second 3D computational model.

* * * * *